(12) United States Patent
Bazzani et al.

(10) Patent No.: US 11,829,445 B1
(45) Date of Patent: Nov. 28, 2023

(54) ATTRIBUTE-BASED CONTENT SELECTION AND SEARCH

(71) Applicant: Amazon Technologies, Inc., Seattle, WA (US)

(72) Inventors: Loris Bazzani, Berlin (DE); Michael Donoser, Berlin (DE); Yuxin Hou, Berlin (DE); Eleonora Vig, Munich (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 266 days.

(21) Appl. No.: 17/361,905

(22) Filed: Jun. 29, 2021

Related U.S. Application Data

(60) Provisional application No. 63/158,107, filed on Mar. 8, 2021.

(51) Int. Cl.
  *G06F 18/22* (2023.01)
  *G06F 16/532* (2019.01)
  *G06F 3/0482* (2013.01)
  *G06N 3/08* (2023.01)
  *G06N 3/04* (2023.01)

(52) U.S. Cl.
  CPC ............ *G06F 18/22* (2023.01); *G06F 16/532* (2019.01); *G06F 3/0482* (2013.01); *G06N 3/04* (2013.01); *G06N 3/08* (2013.01)

(58) Field of Classification Search
  CPC ...... G06F 18/22; G06F 16/532; G06F 3/0482; G06F 3/04842; G06F 16/9535; G06N 3/04; G06N 3/08; G06V 10/945

USPC ......................................................... 707/798
See application file for complete search history.

(56) References Cited

U.S. PATENT DOCUMENTS

| | | | | |
|---|---|---|---|---|
| 10,824,942 | B1 * | 11/2020 | Bhotika | ................... G06N 3/08 |
| 2002/0138481 | A1 * | 9/2002 | Aggarwal | .............. G06Q 30/02 |
| 2012/0323738 | A1 * | 12/2012 | Gokturk | ................. G06Q 30/02 |
| | | | | 705/26.63 |
| 2013/0121571 | A1 * | 5/2013 | Gokturk | ............. G06Q 30/0603 |
| | | | | 382/165 |
| 2017/0097945 | A1 * | 4/2017 | Xu | .......................... G06F 18/22 |
| 2019/0095467 | A1 * | 3/2019 | Kislyuk | ................ G06F 16/738 |
| 2019/0244271 | A1 * | 8/2019 | Piramuthu | ......... G06Q 30/0643 |
| 2019/0311301 | A1 * | 10/2019 | Pyati | ...................... G06F 16/901 |

* cited by examiner

*Primary Examiner* — Evan Aspinwall
(74) *Attorney, Agent, or Firm* — K&L Gates LLP

(57) ABSTRACT

Systems and techniques are generally described for attribute-based content selection and search. In some examples, a graphical user interface (GUI) may display an image of a first product comprising a plurality of visual attributes. In some further examples, the GUI may display at least a first control button with data identifying a first visual attribute of the plurality of visual attributes. In some cases, a first selection of the first control button may be received. In some examples, a first plurality of products may be determined based at least in part on the first selection of the first control button. The first plurality of products may be determined based on a visual similarity to the first product, and a visual dissimilarity to the first product with respect to the first visual attribute. In some examples, the first plurality of products may be displayed on the GUI.

17 Claims, 7 Drawing Sheets

ATTRIBUTE-BASED CONTENT SELECTION AND SEARCH

CROSS REFERENCE TO RELATED APPLICATIONS

This application claims the benefit of U.S. Provisional Patent Application No. 63/158,107, filed Mar. 8, 2021, the disclosure of which is incorporated herein by reference in its entirety.

BACKGROUND

Online content catalogs such as those provided by e-commerce services are often searched using keyword search queries to find content of interest to a user. Various approaches may be used to recommend content to users based on previously purchased and/or previously viewed content. In some examples, users may be able to browse content by selecting an initial content item and then selecting content items that are recommended based on the initial content item, and so on, until a suitable content item is located or until the user abandons the search. In some cases, users may be unaware of the appropriate search terms to use in order to surface a particular product or product feature. Additionally, in some examples, recommendations systems recommend content only based on the currently displayed content.

DETAILED DESCRIPTION

Figure 1:
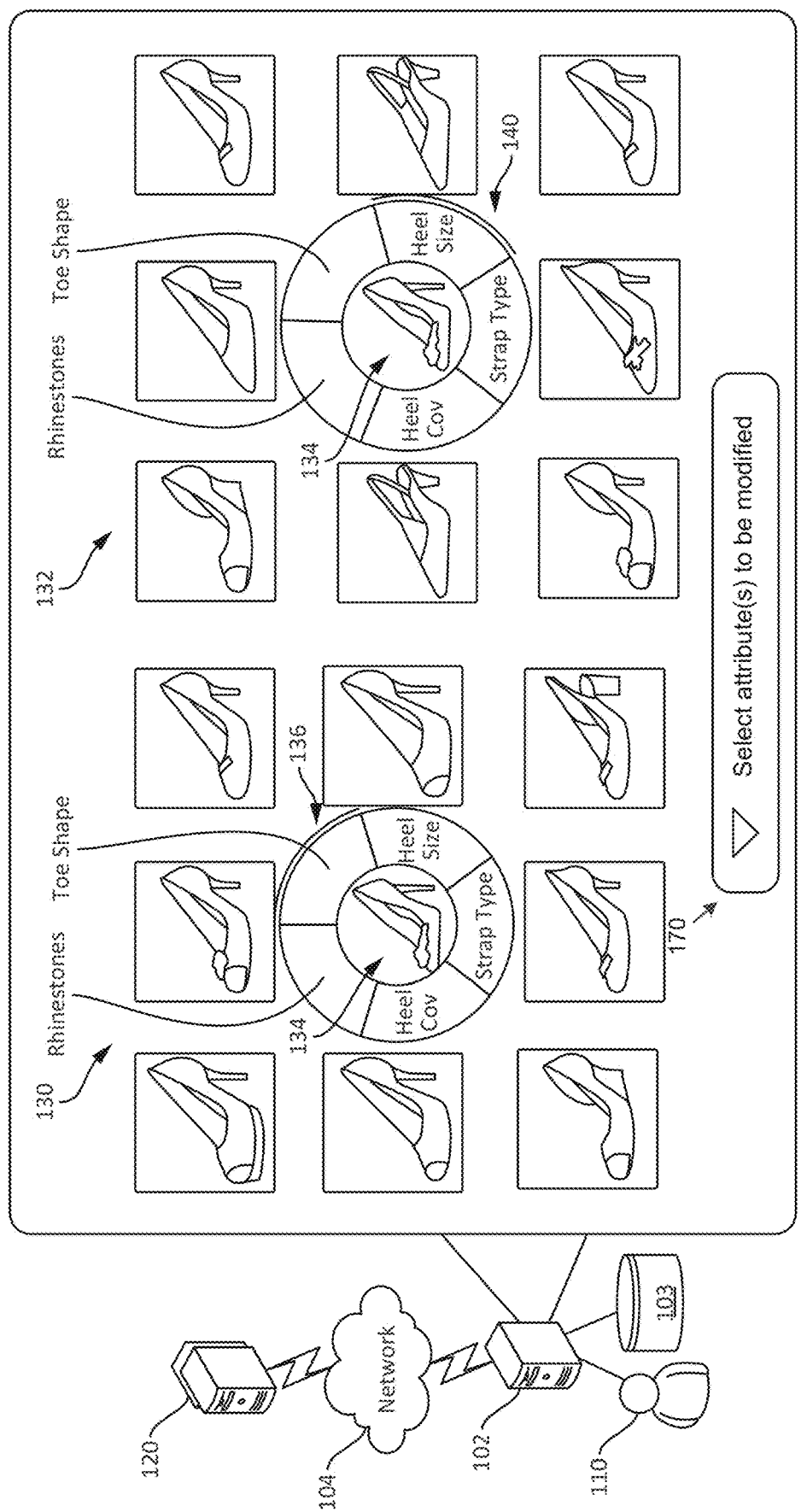
FIG. 1 is a diagram depicting an example interface for attribute-based content selection and/or search, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Searching for content from large online catalogs of content can be challenging, particularly when the content of interest is largely selected on the basis of aesthetic features. For example, fashion, furniture, jewelry, artwork, etc., are often selected on the basis of their appearance, their colors, their materials, and/or other aesthetic attributes. In many cases, a user may want to search for content that shares an overall similarity (e.g., visual similarity) with currently-displayed content, but which differs with respect to one or more visual attributes of the currently-displayed content.

In particular, interactive retrieval for online fashion, furniture, and other visual-based shopping and/or content search provides the ability of changing image retrieval results according to user feedback. One of the main disadvantages of existing methods is that the learned visual representations of content are entangled in the embedding space (feature space), which limits the controllability of the retrieved results. For example, a specific user interaction (e.g., change the color of a T-shirt to grey) may cause inadvertent changes to other aspects of the content (e.g., the results have a sleeve type that is different from the query image). Described herein are systems and techniques that learn attribute-specific subspaces for each attribute type to obtain disentangled representations of visual content. As described herein, such systems and techniques may be used to perform different tasks while maintaining this visual attribute disentanglement property. The various systems and techniques described herein generate disentangled representations that enable state-of-the-art performance on visual attribute manipulation retrieval (e.g., modifying one visual attribute of a query item while maintaining overall visual similarity), conditional similarity retrieval (e.g., finding other content that is similar with respect to a selected visual attribute), and complementary content retrieval (e.g., finding content that is visually complementary, such as retrieval of a pair of pants that are visually complementary with a particular top).

Image search is a fundamental computer vision task. More recently, this task has evolved in the direction of enabling users to provide additional forms of interaction (e.g., sentences, visual attributes, and/or image-clicks) along with the query image. Interactive image retrieval is relevant in the context of online shopping and/or other content retrieval and selection, specifically for content for which appearance is one of the preeminent factors for content selection, such as in fashion. In this context, it is not only necessary to train models to generate expressive visual representations of images, but also to empower the machine learning model with the ability of understanding interactions provided by the user to modify the search results accordingly.

One of the main limitations of existing methods for interactive image retrieval is that the learned representations of visual attributes of query items are entangled in the embedding space. A practical example of this limitation is when a specific user interaction causes other aspects to change inadvertently. For example, a user may want to simply change the color of a particular shirt while maintaining other visual aspects of the shirt. However, due to the entanglement of the visual attributes in the learned representation of the query image, the sleeve length may change in the returned search results relative to the shirt in the query image. Described herein are systems and techniques that may be used to disentangle the representations of different visual attributes during content search and/or selection. These techniques may improve controllability and interpretability of search results. In some examples, the semantics of visual attributes may be leveraged to train convolutional neural networks (CNNs) that learn attribute-specific subspaces via separate loss functions for each attribute type. In this way, it is possible to apply operators directly on the desired subspace (e.g., on a particular visual attribute) selected by the interaction without affecting the other subspaces.

Convolutional neural networks (CNNs) may be used for various image processing tasks such as object recognition, image classification, image search, etc. In various examples, CNNs may learn features (e.g., semantic data representations of attributes of an image) during training. In the examples described herein, CNN architectures may learn embeddings for different attribute-specific subspaces to disentangle the representation of different visual attributes of an item.

FIG. 1 is a diagram depicting an example interface for attribute-based content selection and/or search, according to various embodiments of the present disclosure. In various examples, one or more computing devices 120 may be used to implement the attribute-based content selection and/or search systems and/or techniques described herein. Computing devices 120 may communicate with one another and/or with one or more of the other components depicted in FIG. 1 over a network 104 (e.g., a local area network (LAN) and/or a wide area network (WAN) such as the internet). For example, computing devices 120 may communicate with a non-transitory computer-readable memory 103 over network 104. In various examples, the non-transitory computer-readable memory 103 may store instructions that, when executed by at least one processor of the computing devices 120, may cause the computing devices to perform the various attribute-based content selection and/or search actions described herein.

In various examples, a user 110 may use a computing device 102 (e.g., a mobile device, a laptop, a desktop computer, a wearable device, a human-computer interface, etc.) to access the attribute-based content selection/search interface depicted in FIG. 1 (and/or another attribute-based content selection/search interface). Accordingly, the computing device 102 may include and/or may be configured in communication with a display on which the interface shown in FIG. 1 (or another desired interface) may be displayed, in accordance with various aspects of the present disclosure.

In the example interface depicted in FIG. 1, two grids 130, 132 of shoes are shown for illustrative purposes. In an example, the shoe depicted in the center of the grids (e.g., shoe 134) may represent a query image. In an example, the user may have selected the shoe 134 from an advertisement, from a product recommendation page, from a list of search results (e.g., resulting from a text search, image search, etc.). In the example depicted in FIG. 1, the wheels surrounding the shoe 134 may display the names of various visual attributes that may pertain to the shoe 134. In the example of FIG. 1, the attributes are rhinestones, toe shape, heel size, heel coverage, and strap type. In various examples, the user 110 may select one of the attributes of the wheel in order to see items that are similar to the query item (e.g., to shoe 134), but which differ from the query item with respect to the selected visual attribute.

For example, in grid 130, the user 110 has selected the visual attribute 136 ("toe shape"). Accordingly, shoes that are of a similar overall style to shoe 134, but which have different toe shapes relative to the toe shape of shoe 134 are shown in the grid elements surrounding the central element that depicts shoe 134. For example, while the query image shoe 134 may have a pointed, closed toe, some of the other shoes have rounded toes, open toes, etc.

Grid 132 includes the same she 134 as the query image, but now user 110 has selected a different visual attribute 140 ("heel size"). Accordingly, the shoes surrounding shoe 134 in the grid 132 are of a similar overall style, but the heel size differs in these shoes relative to shoe 134. For example, shoe 134 appears to have a relatively tall heel. Some of the surrounding shoes have wedge heels, and/or other heels of different heights and/or styles relative to the heel of shoe 134.

The ability to determine images that are similar overall, and to modify individual visual attributes while maintaining overall visual similarity (among other computer vision tasks) is enabled by an attribute-specific disentangled encoder 202, described in further detail below. Further, various tasks that may be performed using the attribute-specific disentangled encoder 202 are also described in reference to various figures below.

The graphical interface depicted in FIG. 1 is shown by way of example. However, any desired graphical interface may be used to perform the various attribute modification tasks discussed herein. For example, sliders may be used to vary various visual attributes of an item while maintaining overall visual similarity to a query item. In a slider example, the slider may be used to modify the weights that are used to modify the visual attribute(s) to be changed. In various examples, the interface depicted in FIG. 1 may also be used to perform conditional similarity retrieval, as discussed in further detail below. As depicted in FIG. 1, in some examples, a graphical control (e.g., a button, drop-down menu, etc.) may be displayed enabling a user to select the attributes of a query item to be modified using the various techniques described herein. Additionally, a graphical control button 170 may be used to perform a conditional similarity retrieval and/or to retrieve complementary content of a particular category, as described in further detail below.

Figure 2:
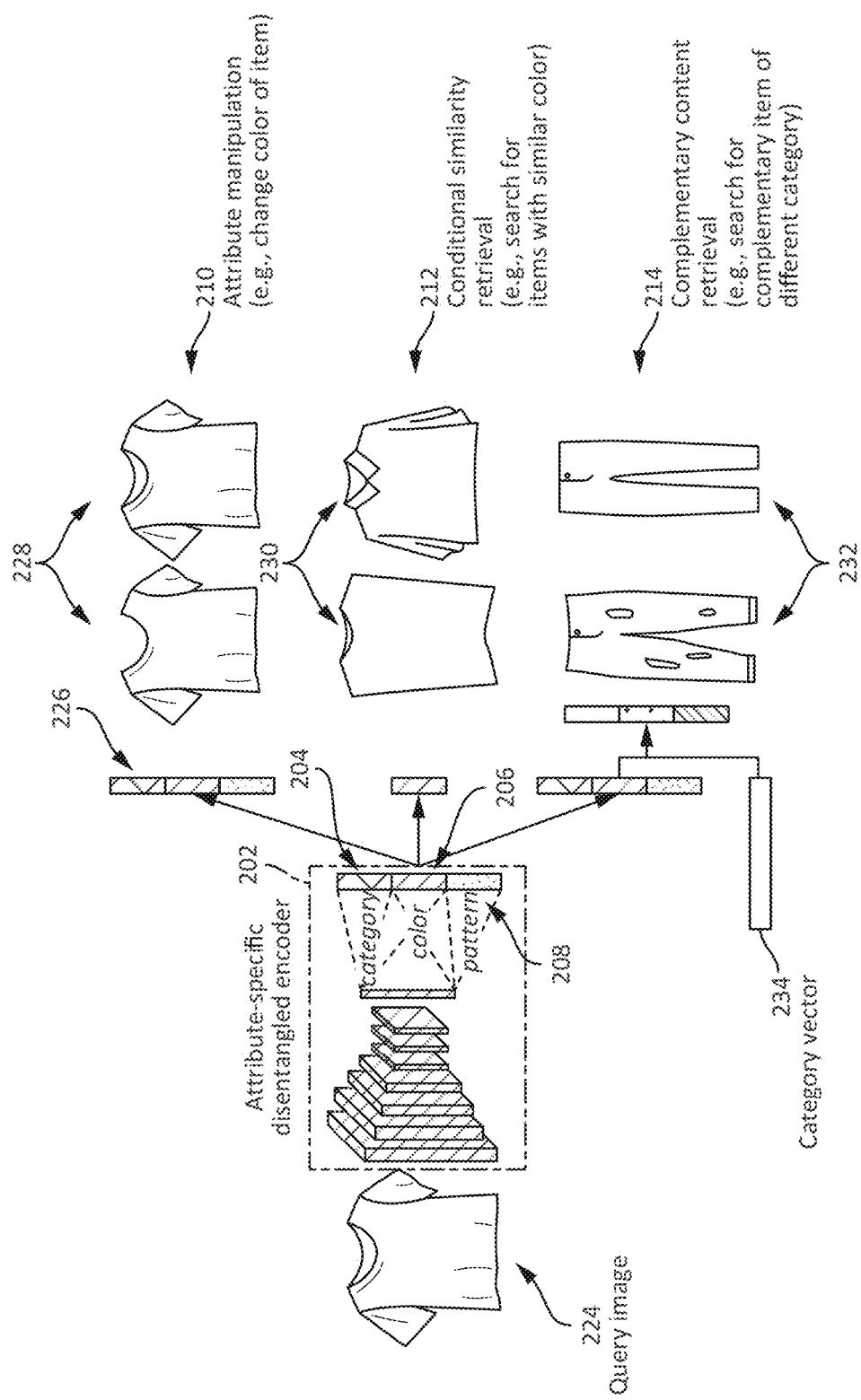
FIG. 2 depicts an attribute-specific disentangled encoder that may be used for different content search and/or selection tasks, in accordance with various aspects of the present disclosure.

FIG. 2 depicts an attribute-specific disentangled encoder 202 that may be used for different content search and/or selection tasks, in accordance with various aspects of the present disclosure. As shown in FIG. 2, once the attribute-specific disentangled encoder 202 has generated disentangled representations of images with subspaces for each visual attribute (e.g., for the visual attributes 204 (category), 206 (color), and 208 (pattern)), different tasks may be performed using the disentangled representations. For example, attribute manipulation 210 may be performed by modifying the representation of the visual subspace corresponding to one of the visual attributes. In the example depicted in FIG. 2, attribute manipulation 210 may involve determining items that are visually similar to the query image 224, but which are dissimilar with respect to a selected visual attribute (e.g., color in FIG. 2). Accordingly, in the representation 226 (e.g., an embedding generated during attribute manipulation 210), the category visual attribute 204 and the pattern visual attribute 208 remain unchanged, but the color visual attribute 206 has been modified. Accordingly, the items 228 are similar to the shirt in the query image 224 in terms of pattern and category, but may be different from the query image 224 in terms of color. Attribute manipulation 210 is described in further detail below in reference to FIG. 3.

In conditional similarity retrieval 212, the representation of a visual attribute 206 (e.g., color or another visual attribute) may be used to determine content that is similar to that specific visual attribute of the query image 224. Accordingly, in the example depicted in FIG. 2, items 230 may be similar in terms of the visual attribute 206 "color" with respect to query image 224, but may otherwise not be similar. In other words, similarity along other dimensions apart from the selected visual attribute for conditional similarity retrieval (color, in the current example) is not enforced. Conditional similarity retrieval is described in further detail below.

In complementary content retrieval 214, complementary content of a different category with respect to a category of the query image 224 may be determined. In various examples, a category vector 234 may be specified indicating a target category for output content. In various examples, complementary content retrieval 214 may determine items 232 that are determined to be complementary to the query image 224 and which are of the category specified by the category vector 234. Complementary content retrieval is described in further detail below in reference to FIG. 4.

Figure 3:
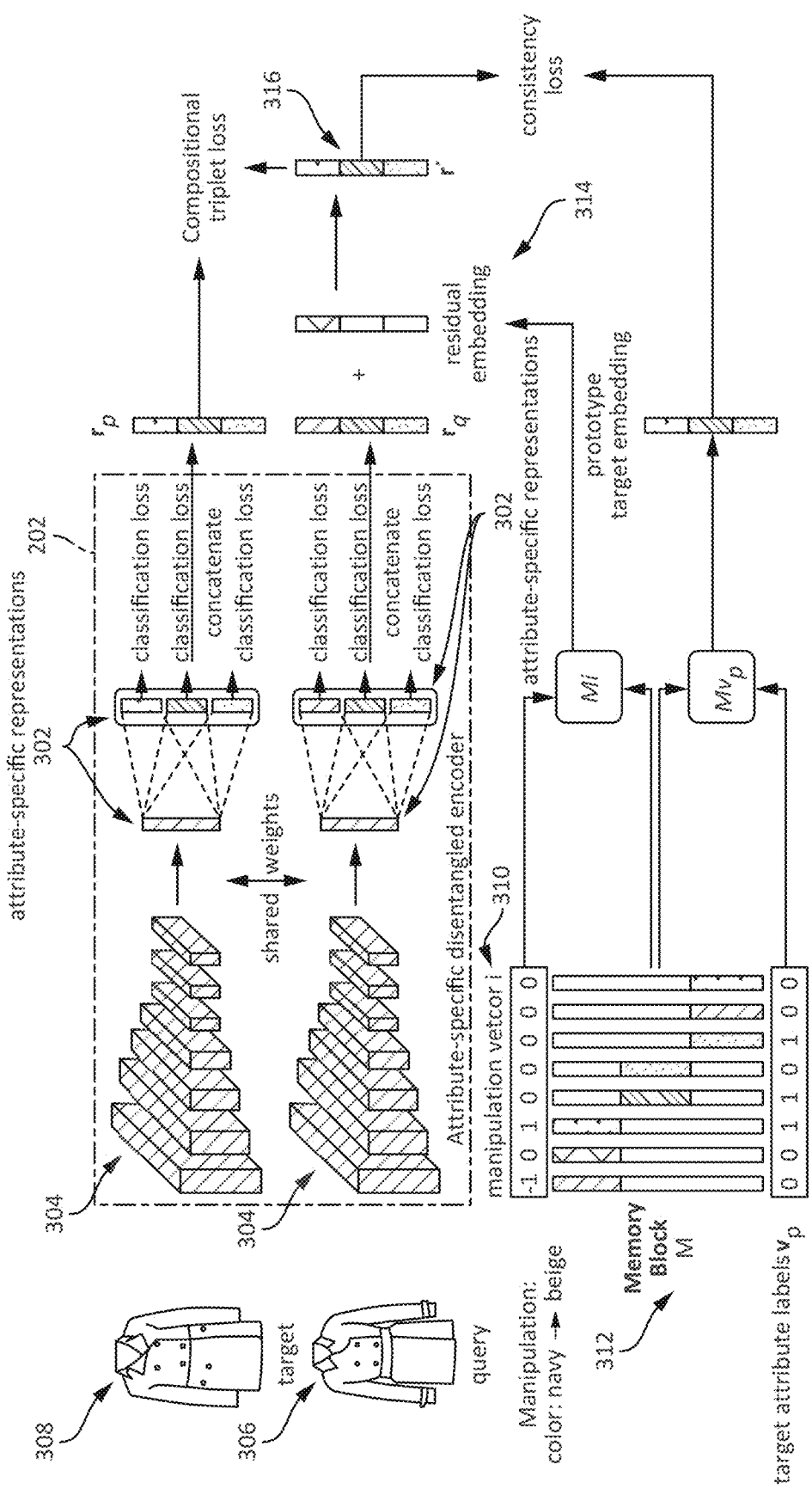
FIG. 3 depicts an example architecture for attribute manipulation using an attribute-driven disentangled encoder, in accordance with various aspects of the present disclosure.

FIG. 3 depicts an example architecture for attribute manipulation using an attribute-specific disentangled encoder 202, in accordance with various aspects of the present disclosure. Prior to discussing attribute manipulation, the architecture of the attribute-specific disentangled encoder 202 is described.

Attribute-driven Disentanglement

In various examples, machine learning architectures are described that are effective to disentangle semantic factors in different visual attribute sub-spaces to generate embeddings that are useful for content selection and/or retrieval tasks. In various examples described herein, visual attributes may be used as supervised signals to guide the learning of disentangled representations. The architecture for the attribute-specific disentangled encoder 202 is shown in FIG. 3. The attribute-specific disentangled encoder 202 generates attribute-specific representations 302. In various examples, a deep CNN 304 (e.g., AlexNet, ResNet, etc.) may be used as the backbone network to encode the representation $f_n$ of an input image In (e.g., input image 306, 308).

In various examples, there may be a predefined list of visual attributes (e.g., color, style, fabric, pattern, etc.) of size A that may be indexed with the symbol a. Each visual attribute α is associated with a list of possible attribute values ($v_\alpha^1, v_\alpha^2, \ldots, v_\alpha^{J\alpha}$), where $J_\alpha$ is the total number of possible values. The image representation $f_n$ may be fed into a fully-connected two-layer network for each visual attribute a which maps $f_n$ to visual attribute-specific subspaces $r_{n,\alpha}=FC_\alpha(f_n)$. Then the representation $r_{n,\alpha}$ is used to predict the visual attribute values for the given image via a classification layer made of a fully-connected layer with softmax: $\hat{y}_{n,\alpha}=\text{softmax}(r_{n,\alpha})$.

The training of such subspaces may be supervised via independent multi-label attribute-classification tasks defined in the form of cross-entropy loss as follows:

$$L_{cls} = -\sum_{n=1}^{N}\sum_{a=1}^{A}\log(P(y_{n,a} \mid \hat{y}_{n,a})) \quad (1)$$

$y_{n,\alpha}$ extracts the ground truth label of the image $I_n$ for visual attribute α, $\hat{y}_{n,\alpha}$ is the output of the softmax layer, and N is the number of samples in the training set. The disentangled representation of a given image $I_n$ is obtained by concatenating the visual attribute-specific embeddings $r_n=(r_{n,1}, \ldots, r_{n,A})$, where $r_n \in \mathbb{R}^{A \cdot d}$ and d is the dimension of each attribute-specific embedding.

Attribute Manipulation Retrieval

The example depicted in FIG. 3 describes visual attribute manipulation using the attribute-specific disentangled encoder 202. This example use case of the attribute-specific disentangled encoder 202 may be used to search for and select images that are visually similar to a query image, but which are dissimilar with respect to one or more selected visual attributes. For example, the interface of FIG. 1 describes an interface for providing such visual attribute manipulation for images of shoes.

For ease of illustration, the visual attribute notation may merge the visual attribute values for different visual attributes into a list $v=(v^1, v^2, \ldots, v^J)$, where $J=\Sigma_{\alpha=1}^{A}J_\alpha$. Note that it is always possible to group back the values into visual attribute-specific subspaces, to maintain their semantics. One-hot encoding may be used for each of the $v^J$ visual attributes in the image. For example, each visual attribute value that is present in an image may be encoded with 1s while non-present values may be encoded as 0s.

The visual attribute manipulation retrieval task may be formulated as described below. Given a query image $I_q$ (query image 306), which has associated visual attribute values $v_q=(v_q^1, v_q^2, \ldots, v_q^J)$ the goal of the visual attribute manipulation retrieval task is to find a target product image $I_p$, whose attribute description is $v_p=(v_p^1, v_p^2, \ldots, v_p^J)$, and differs from $v_q$ only for a subset of selected visual attributes.

FIG. 3 depicts the proposed architecture for visual attribute manipulation. The query image 306 and target image 308 are encoded using the visual attribute-specific disentangled encoder 202 into the attribute-specific representations 302—namely, $r_q$ and $r_p$, respectively. To represent the visual attribute manipulations, a manipulation vector $i=v_p-v_q=(i^1, i^2, \ldots, i^J)$ is generated, where $i \in f\{-1, 1, 0\}$. The manipulation vector i (manipulation vector 310) corresponds to removing, adding, and/or maintaining a visual attribute value. The manipulation vector 310 is multiplied by a memory block 312 that stores the prototype disentangled embeddings. The output, residual embedding 314 (e.g., a residual representation), is then composed to the query representation $r_q$. This compositional embedding 316 may be used to search a database of images (e.g., a product database of product images, etc.) to find the embedding that includes (and/or is closest to in the embedding space) the target visual attribute values specified in the manipulation vector 310. The compositional embedding 316 is trained to be as close as possible to the representation ($r_p$) of the target image 308. During training, the attribute-specific disentangled encoder 202 and the memory block 312 may be jointly trained with different loss functions described below. Any number (e.g., a specified number) of attributes may be modified using the architecture described in FIG. 3.

Memory Block 312

To support the manipulation of visual attribute values, a memory block $M \in \mathbb{R}^{A \cdot d \times J}$ is introduced that stores prototype embeddings for each attribute value in the columns of the memory block 312. For example, for the color attribute, a prototype embedding may be stored in the memory block 312 for each specific color in the dataset. The memory block 312 may be initialized by averaging the visual attribute-specific embeddings of those training images that have the same visual attribute value. This per-visual attribute averaged representation comprises the initial prototype embeddings and are stored in the columns of the memory block matrix:

$$M = \begin{pmatrix} e_1^1 & \ldots & e_1^{J_1} & 0 & \ldots & 0 & 0 & \ldots & 0 \\ 0 & \ldots & 0 & e_2^1 & \ldots & e_2^{J_2} & 0 & \ldots & 0 \\ \ldots & \ldots & \ldots & \ldots & \ldots & \ldots & \ldots & \ldots & \ldots \\ 0 & \ldots & 0 & 0 & \ldots & 0 & e_A^1 & \ldots & e_A^{J_A} \end{pmatrix} \quad (2)$$

where $e_\alpha^j$ denotes the prototype embedding for the j-th attribute value for the attribute $\alpha$.

Given the query image 306 and its representation $r_q$, the manipulation vector 310(i) and the memory block 312 ($\mathcal{M}$), the target compositional representation 316 may be computed as:

$$r' = r_q + \mathcal{M}_i \quad (3)$$

The main intuition of this operation is that the original representation of the query image $r_q$ is modified by a subset of prototype visual attribute-specific representations in $\mathcal{M}$ which are positively or negatively signed by the manipulation vector 310.

Memory Block 312 Loss

During training, the prototypes in the memory block 312 are updated. To ensure that disentanglement is preserved, the memory block 312 is enforced to maintain its block-diagonal structure with off-block-diagonal zeros. Therefore, a regularization loss is used on the non-diagonal elements:

$$L_{mem} = \|\mathcal{M} \circ \mathcal{N}\|_1, \quad (4)$$

$$\mathcal{N} = 1_D - \mathcal{D}, \mathcal{D} = \begin{pmatrix} 1_{M_1} & 0 & \ldots & 0 \\ 0 & 1_{M_2} & \ldots & 0 \\ \ldots & \ldots & \ldots & \ldots \\ 0 & 0 & \ldots & 1_{M_A} \end{pmatrix} \quad (5)$$

where $1\mathcal{M}_A$ denotes a matrix of ones of size $d \times J_\alpha$, $\circ$ is the element-wise multiplication, $\mathcal{D}$ indicates the elements in diagonal blocks and $\mathcal{N}$ corresponds to the non-diagonal elements. The L1-norm regularization loss helps to curb the mixing of different visual attribute-specific embeddings during training.

Compositional Triplet Loss

A compositional triplet loss is used to encourage the compositional representation 316 (r') to be close to the positive representations that include the desired attributes. Given the query image 306 and a randomly generated manipulation vector 310, a positive sample is selected (e.g., a sample image that is visually similar overall to the query image 306) that has the desired target attribute labels, and randomly choose a negative sample that has different attribute labels. Then the compositional triplet loss may be defined as:

$$L_{ct} = \max(0, d(r', r_p^{ct}) - d(r', r_n^{ct}) + m) \quad (6)$$

where $r_p^{ct}$ and $r_n^{ct}$ are the normalized disentangled representations of the positive and negative sample respectively, m is the margin parameter, and $d(\cdot)$ is the L2 distance.

Consistency Loss

Because of the diagonal structure of the memory block 312, the attribute label vector may be projected into the disentangled embedding space of the attribute-specific representations 302 directly. Intuitively, as the attribute label vector and the image characterize the same image, they should encode the same semantic information, hence the representation extracted from the image should be close to the representation projected from the attribute label vector. To this end a loss function is introduced that encourages this semantic consistency:

$$L_c = d(r_q, \mathcal{M}_{v_q}) + d(r', \mathcal{M}_p^{ct}) + d(r_n^{ct}, \mathcal{M}_n^{ct}) \quad (7)$$

where $V_r$, $V_p^{ct}$, $V_n^{ct}$ are the attribute label vectors of the reference image, positive sample and negative sample generated according to the visual attribute manipulation task. The consistency loss helps to align the prototype embeddings in the memory block 312 with learned embeddings, which is beneficial for attribute manipulation. On the other hand, the prototype embeddings can be regarded as pseudo-supervision for attribute-specific representation learning.

Label Triplet Loss

An additional triplet loss is used to encourage images with the same attributes to have similar representations:

$$L_{lt} = \max(0, d(r_q, r_p^{lt}) - d(r_q, r_n^{lt}) + m) \quad (8)$$

where $r_p^{lt}$ and $r_n^{lt}$ are the normalized disentangled representations for the positive and negative samples respectively. The positive samples are those that have the same ground truth attribute labels as the reference images. The final loss function used to train the network shown and described in reference to FIG. 3 may be defined as the weighted sum of the individual losses. For example: $L_{total} = W_{cls}L_{cls} + W_{cLc} + W_{ctLct} + W_{ltLlt} + W_{mem}L_{mem}$.

During testing, the disentangled representations $r_n$ may be extracted for each image to create the index. To perform attribute manipulation retrieval, given a query image $I_q$ and the manipulation vector i, the compositional representation 316 is computed and a KNN search of the index is performed to find the items with the matching modified attributes.

Returning to FIG. 2, the conditional similarity retrieval 212 task may be performed as follows. The visual attribute-specific embeddings (e.g., attribute-specific representations 302) described in reference to FIG. 3 encode conditional similarity naturally, when searching for images with a given attribute (e.g., search for items with similar color). Accordingly, the conditional similarity retrieval 212 task may be used to retrieve items having a visually-similar attribute using the attribute-specific representations 302 without regard to the similarity of other visual attributes. In particular, the architecture may be fine-tuned for the conditional similarity retrieval 212 task using a standard triplet loss. Then the subspace of the query embedding specified by the provided condition may be directly selected and KNN search may be performed to find similar items with respect to the selected visual attribute of the query image.

Figure 4:
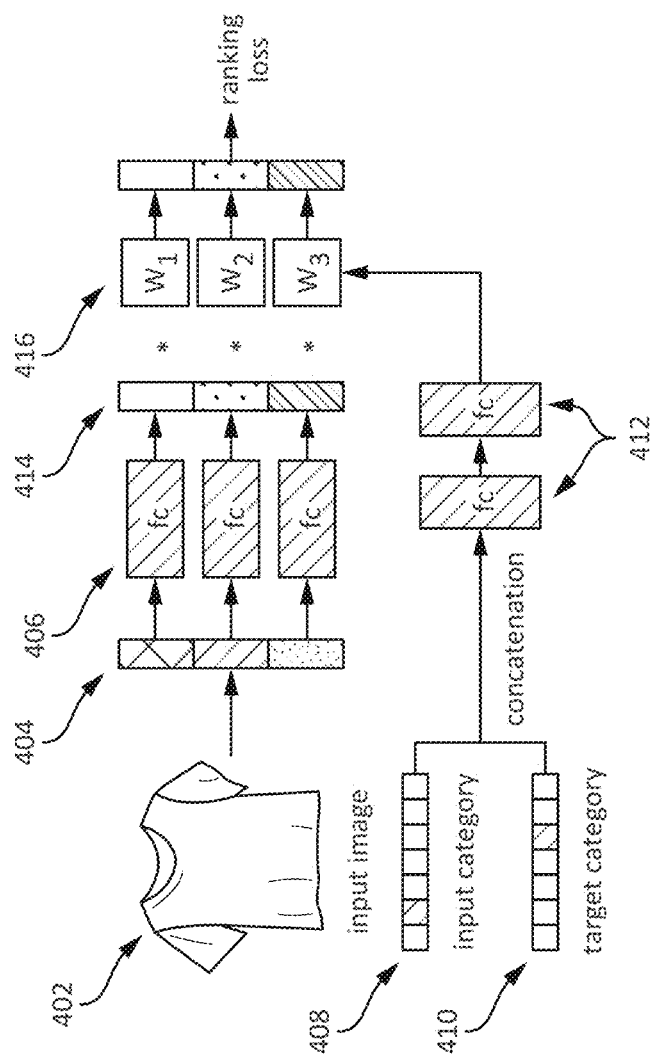
FIG. 4 depicts an example architecture for complementary content retrieval, in accordance with various aspects of the present disclosure.

FIG. 4 depicts an example architecture for complementary content retrieval, in accordance with various aspects of the present disclosure. Outfit item compatibility and similarity can be addressed in the semantic space of disentangled visual attributes. Intuitively, to determine if two items are visually compatible, it may be determined whether the items' disentangled visual attributes are harmonious. Although the notion of visual harmony, visual compatibility, (e.g., the notion of what visual attributes are complementary to one another), etc., is subjective in nature, the complementary content retrieval may be trained using image sets of items labeled as complementary (e.g., by fashion experts). For example, the color blue may be defined as being complementary with the color yellow, and/or A-shape tops may be defined as complementary with respect to skinny pants, etc. The attribute-driven disentangled representation (e.g., attribute-specific representations 302 from FIG. 3) can be adopted for modeling compatibility.

FIG. 4 illustrates the overview of a complementary content retrieval model. The pre-trained attribute-specific disentangled encoder 202 from FIG. 2 may be used to extract disentangled attribute-specific representations 404 ($r_n$) (e.g., attribute-specific representations 302) of each input image 402 ($I_n$) of an outfit. One fully-connected layer (e.g., FCs 406) may be added for each attribute: $z_{n,\alpha} = FC_\alpha(r_{n,\alpha})$. The category of the item in an outfit and the category of the target item to retrieve are encoded as one-hot vectors 408 and 410 ($C_r$ and $c_t$ respectively), concatenated and fed into a fully-connected two-layer network 412 with softmax output: $w = 2FC((c_r, c_t))$. The vector 416 ($w \in \mathbb{R}^A$) contains attentional weights that are multiplied to each attribute embedding of the attribute-specific representations 414 output by the FCs 406 to focus on attributes important for the provided target category: $Y_{n,a} = W_\alpha \cdot z_{n,\alpha}$. Note that although fully-connected two-layer network 412 is specifically depicted and described, any multi-layer network of fully-connected layers may be used (e.g., an fully-connected network having any number of layers).

Training

Training for the complementary content retrieval task may comprise optimizing the outfit ranking loss that considers distances on entire outfits (and/or other ensemble visual content such as furniture sets, etc.) rather than on single items. Note that the architecture retains the visual attribute-specific semantics in the different output subspaces $\gamma_{n,\alpha}$, and thus preserves disentanglement.

Testing

The index may be generated by computing the attribute-specific embeddings for each image in each outfit $\gamma_n = (\gamma_{n,1}, \ldots, \gamma_{n,A})$. During retrieval, $\gamma_q$ is computed for each image in the query outfit given its category and the target category. KNN is performed with such representation to retrieve the compatible items. The ranking scores from images of the same query outfit may be fused by taking their average.

Figure 5:
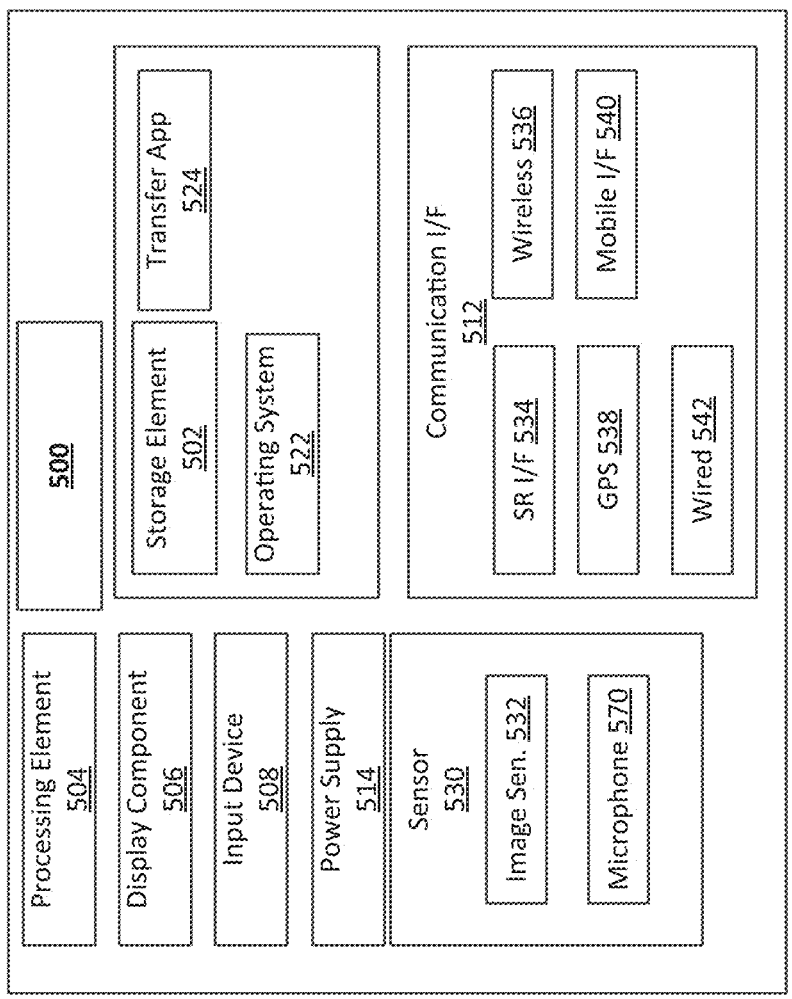
FIG. 5 is a block diagram showing an example architecture of a computing device that may be used in accordance with various aspects of the present disclosure.

FIG. 5 is a block diagram showing an example architecture 500 of a computing device that may be used to perform attribute-based content selection and search as described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
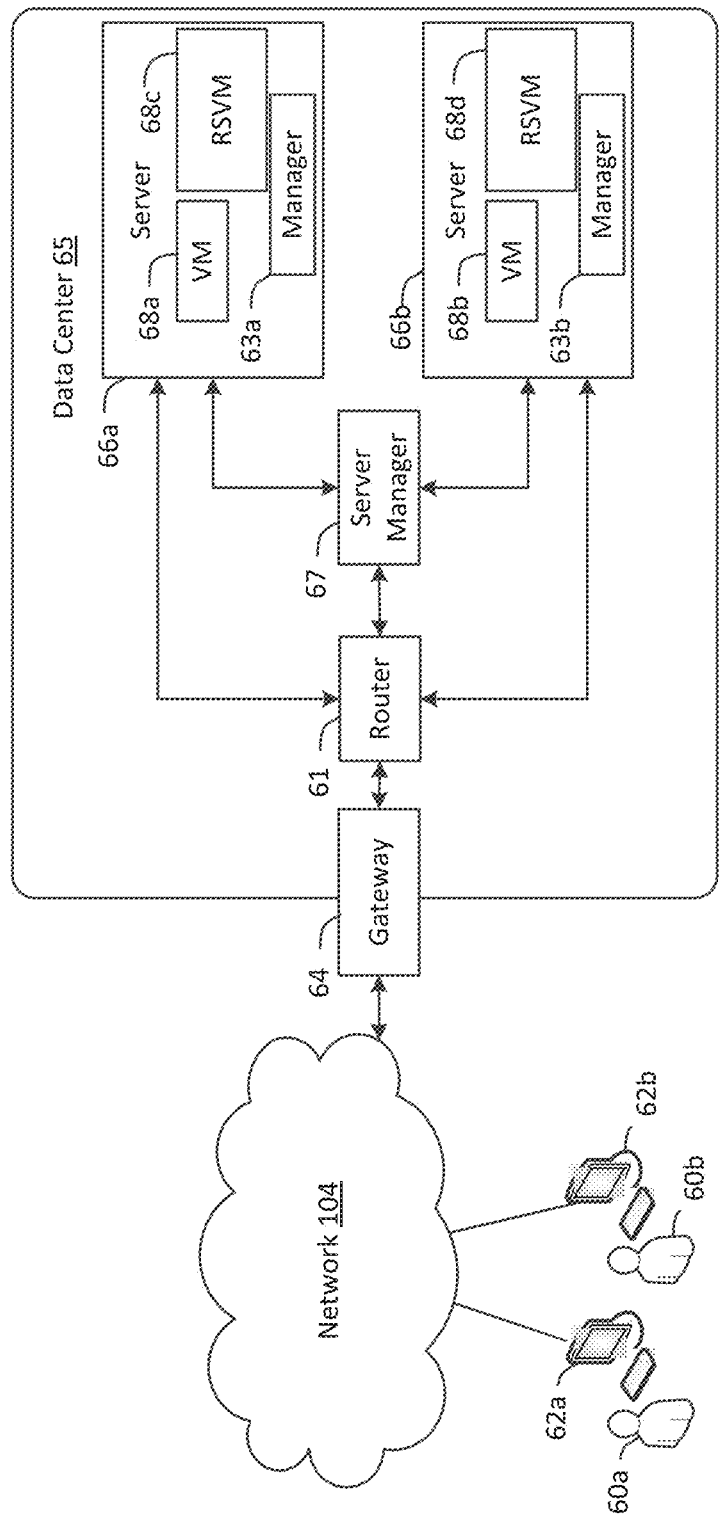
FIG. 6 is a diagram illustrating an example system for sending and providing data that may be used in accordance with various aspects of the present disclosure.

An example system for sending and providing data will now be described in detail. In particular, FIG. 6 illustrates an example computing environment in which the embodiments described herein may be implemented. For example, the computing environment of FIG. 6 may be used to implement the various attribute-based content selection and search techniques described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Figure 7:
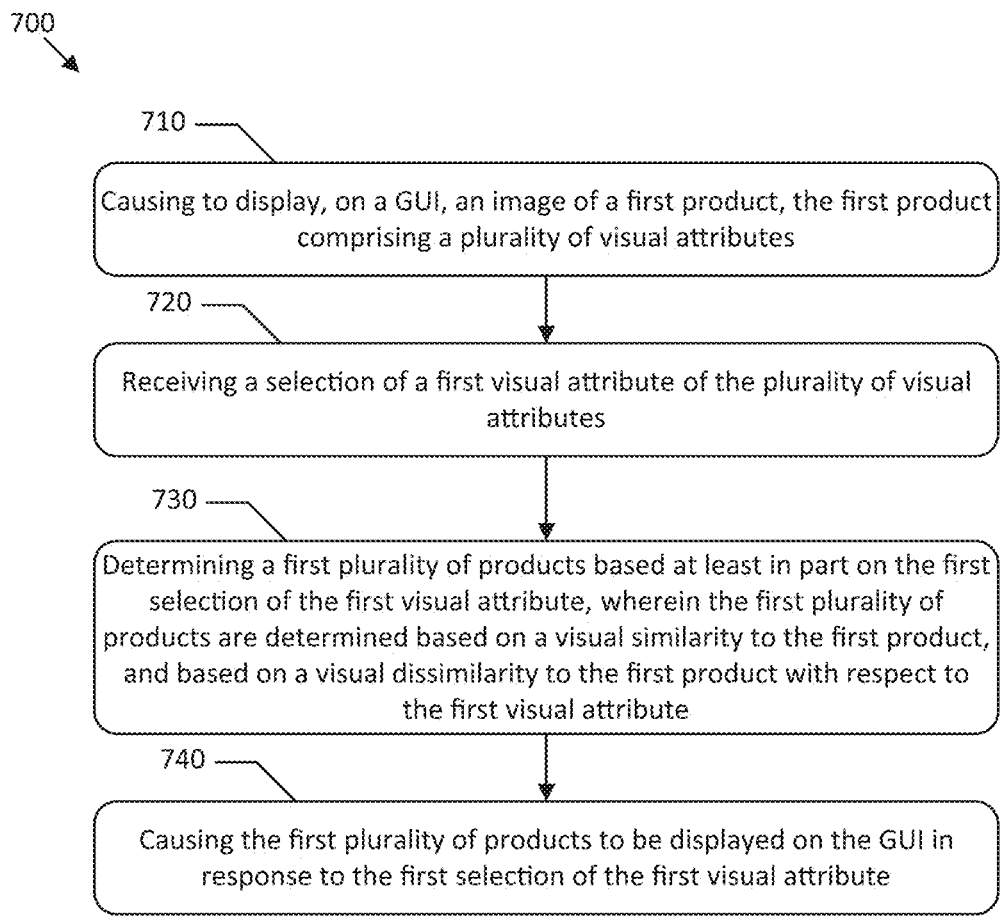
FIG. 7 depicts a flowchart illustrating an example process for attribute-based content selection and search, according to various aspects of the present disclosure.

FIG. 7 is a flow chart illustrating an example process 700 for attribute-based content selection and search, in accordance with various aspects of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which executable code may cause a computing device (e.g., a user device) to display an image of a first product. The first product may comprise a plurality of visual attributes. For example, if the product is a shoe, the shoe may comprise the visual attributes "heel type," "strap type," "sole type," "color," "material," etc. In various other examples, the visual attributes may be more granular and less categorical. For example, instead of the categorical visual attribute "color," the visual attribute may be "red," "blue," etc. The particular visual attributes (and their definitions) may depend on the particular implementation. In some examples, control buttons may be displayed on the GUI that describe the visual attributes of the product. However, in other examples, data identifying the visual attributes may not be displayed.

Process 700 may continue from action 710 to action 720, at which a selection of a first visual attribute of the plurality of visual attributes may be received. In various examples, the selection may be a click (or touch input, etc.) on a control button describing and/or identifying the attribute. In some other examples, the selection may be a click (or touch input, etc.) on the portion of an image of the product that corresponds to the first visual attribute. In other examples, the selection may comprise a natural language request. For example, a user may say, "Computer, show me similar shoes but with different straps," or "Computer, show me similar shoes in blue," etc. In other examples, the natural language input may be a text input instead of, or in addition to, a spoken input.

Process 700 may continue from action 720 to action 730, at which a first plurality of products may be determined based at least in part on the first selection of the first visual attribute. The first plurality of products may be a set of products determined to be visually similar to the first product, but which are visually dissimilar to the first product with respect to the selected first visual attribute. For example, if the first selection of the first visual attribute is the request "Computer, show me similar shoes that are leather," shoes that are similar in style (e.g., heel type, color, toe style, overall shoe style, etc.) may be determined, but which are leather as opposed to the material of the currently-displayed shoe.

Process 700 may continue from action 730 to action 740, at which executable code may cause a computing device (e.g., a user device) to display the first plurality of products in response to the first selection of the first visual attribute. The products may be displayed in various visual displays, such as those shown in FIG. 1 and/or in any other desired configuration.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of displaying content, comprising:
causing to display, on a graphical user interface (GUI), an image of a first product, the first product comprising a plurality of visual attributes;
causing to display, on the GUI, a plurality of control buttons, wherein each respective control button displays data identifying a respective visual attribute of the plurality of visual attributes;
receiving a first selection of a first control button of the plurality of control buttons, the first control button corresponding to a first visual attribute;
generating, by a first machine learning model, a representation of the image of the first product, the representation comprising an attribute-specific representation of each attribute of the plurality of visual attributes;
generating first data representing a change in the first visual attribute;
combining the first data and the representation of the image of the first product to generate a compositional embedding;
determining a first plurality of other products that are visually similar to the first product with respect to visual attributes of the plurality of visual attributes apart from the first visual attribute by searching a feature space using the compositional embedding, wherein the first plurality of other products are visually dissimilar to the first product with respect to the first visual attribute; and causing the first plurality of other products to be displayed on the GUI in response to the first selection of the first control button of the plurality of control buttons.

2. The method of claim 1, further comprising:

receiving a second selection of a second control button of the plurality of control buttons, the second control button corresponding to a second visual attribute;

determining a second plurality of other products that are visually similar to the first product with respect to visual attributes of the plurality of visual attributes apart from the second visual attribute, and which are visually dissimilar to the first product with respect to the second visual attribute; and causing the second plurality of other products to be displayed on the GUI in response to the first selection of the first control button of the plurality of control buttons.

3. The method of claim 1, further comprising:

receiving a selection of a second control button, the second control button effective to cause a plurality of products with visual attributes corresponding to the first visual attribute to be determined without regard to other visual attributes of the plurality of visual attributes; and determining a second plurality of other products that are visually similar to the first product with respect to the first visual attribute.

4. A method comprising:

causing to display, on a graphical user interface (GUI), an image of a first product, the first product comprising a plurality of visual attributes;

generating, by a first machine learning model, a representation of the image of the first product, the representation comprising a respective attribute-specific representation of each attribute of the plurality of visual attributes;

receiving a first selection of a first visual attribute of the plurality of visual attributes;

generating first data representation a change in the first visual attribute;

combining the first data and the representation of the image of the first product to generate a compositional embedding;

determining a first plurality of products based at least in part on a search of a feature space using the compositional embedding, wherein the first plurality of products are determined based on a visual similarity to the first product, and based on a visual dissimilarity to the first product with respect to the first visual attribute; and causing the first plurality of products to be displayed on the GUI in response to the first selection of the first visual attribute.

5. The method of claim 4, further comprising:

receiving a second selection of the first visual attribute, wherein the second selection comprises a request to see other products having similar visual attributes to the first visual attribute; and determining a second plurality of products based at least in part on the second selection, wherein the second plurality of products are determined to have visual similarity to the first visual attribute of the first product.

6. The method of claim 4, further comprising:

receiving a second selection comprising a request to see visually complementary products to the first product;

determining a category associated with the second selection;

determining a second product associated with the category based at least in part on a visual compatibility with the first product; and causing the second product to be displayed on the GUI in response to the second selection.

7. The method of claim 4, further comprising:

receiving a second selection of a second visual attribute of the plurality of visual attributes;

determining a second plurality of products based at least in part on the second selection of the second visual attribute, wherein the second plurality of products are determined based on a visual similarity to the first product, and based on visually dissimilarity to the first product with respect to the second visual attribute; and causing the second plurality of products to be displayed on the GUI in response to the second selection of the second visual attribute.

8. The method of claim 4, further comprising:

determining a plurality of disentangled embeddings for visual attributes of products in a product database; and storing the plurality of disentangled embeddings in a memory block.

9. The method of claim 8, further comprising:

generating first vector data representing a change in the first visual attribute based at least in part on the first selection of the first visual attribute; and generating a residual representation by multiplying the first vector data by the plurality of disentangled embeddings for visual attributes in the memory block.

10. The method of claim 9, further comprising:

combining the residual representation with the representation of the image of the first product to generate the compositional embedding.

11. A system comprising:

at least one processor; and non-transitory computer-readable memory storing instructions that, when executed by the at least one processor, are effective to:

cause to display, on a graphical user interface (GUI), an image of a first product, the first product comprising a plurality of visual attributes;

cause to display, on the GUI, a first control button corresponding to a first visual attribute of the plurality of visual attributes;

receive a first selection of the first control button;

generate, by a first machine learning model, a representation of the image of the first product, the representation comprising a respective attribute-specific representation of each attribute of the plurality of visual attributes;

generate first data representation a change in the first visual attribute;

combine the first data and the representation of the image of the first product to generate a compositional embedding;

determine a first plurality of products based at least in part on a search of a feature space using the compositional embedding, wherein the first plurality of products are determined based on a visual similarity to the first product, and based on a visual dissimilarity to the first product with respect to the first visual attribute; and cause the first plurality of products to be displayed on the GUI in response to the first selection of the first control button.

12. The system of claim 11, the non-transitory computer-readable memory storing further instructions that, when executed by the at least one processor, are further effective to:
receive a selection of a second control button; and
determine a second plurality of products based at least in part on the selection of the second control button, wherein the second plurality of products are determined to have visual similarity to the first visual attribute of the first product.

13. The system of claim 11, the non-transitory computer-readable memory storing further instructions that, when executed by the at least one processor, are further effective to:
receive a selection of a second control button;
determine a category associated with the second control button;
determine a second product associated with the category based at least in part on a visual compatibility with the first product; and
cause the second product to be displayed on the GUI in response to the selection of the second control button.

14. The system of claim 11, the non-transitory computer-readable memory storing further instructions that, when executed by the at least one processor, are further effective to:
receive a second selection of a second control button, the second control button corresponding to a second visual attribute;
determine a second plurality of products based at least in part on the second selection of the second control button, wherein the second plurality of products are determined based on a visual similarity to the first product, and based on visually dissimilarity to the first product with respect to the second visual attribute; and
cause the second plurality of products to be displayed on the GUI in response to the second selection of the second control button.

15. The system of claim 11, the non-transitory computer-readable memory storing further instructions that, when executed by the at least one processor, are further effective to:
determine a plurality of disentangled embeddings for visual attributes of products in a product database; and
store the plurality of disentangled embeddings in a memory block.

16. The system of claim 15, the non-transitory computer-readable memory storing further instructions that, when executed by the at least one processor, are further effective to:
generate first vector data representing a change in the first visual attribute based at least in part on the selection of the first control button; and
generate a residual representation by multiplying the first vector data by the plurality of disentangled embeddings for visual attributes in the memory block.

17. The system of claim 16, the non-transitory computer-readable memory storing further instructions that, when executed by the at least one processor, are further effective to:
combine the residual representation with the representation of the image of the first product to generate the compositional embedding.

\* \* \* \* \*